W. METCALF.
SPRING-WASHER.
No. 174,969.  Patented March 21, 1876.
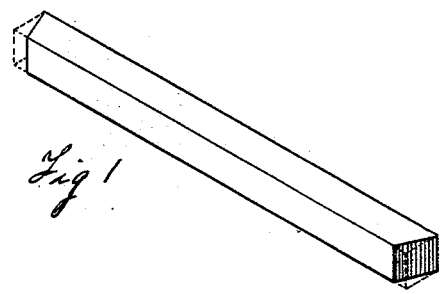
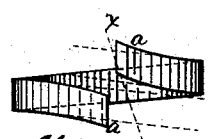
Fig. 2
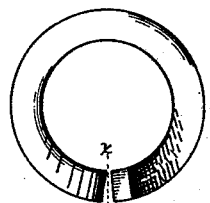
Fig. 3
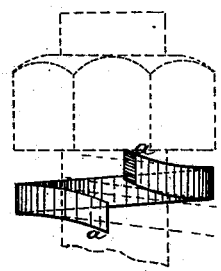
Fig. 4
Witnesses
James L. Kay
R. O. Whenshall
Inventor
William Metcalf
by Bakewell & Kerr
Attys

UNITED STATES PATENT OFFICE.

WILLIAM METCALF, OF PITTSBURG, PENNSYLVANIA, ASSIGNOR TO METCALF, PAUL & CO., OF SAME PLACE.

IMPROVEMENT IN SPRING-WASHERS.

Specification forming part of Letters Patent No. 174,969, dated March 21, 1876; application filed December 13, 1875.

*To all whom it may concern:*

Be it known that I, WILLIAM METCALF, of Pittsburg, in the county of Allegheny and State of Pennsylvania, have invented a new and useful Improvement in Spring-Washers; and I do hereby declare the following to be a full, clear, and exact description thereof, reference being had to the accompanying drawings, forming part of this specification, in which—

Figure 1 is a view of a blank for forming my improved spring-washer; Figs. 2, 3, and 4, views of a spring-washer embodying my invention.

Like letters refer to like parts wherever they occur.

My invention relates to that class of articles known as spring-washers, and employed as nut-locks and for similar purposes; and it consists in a spring-washer the edges of which, next the section or cut, project beyond the true helical plane, so as to form biting points or edges which, under all circumstances, project beyond the general surface of the washer.

Heretofore, in the manufacture of spring-washers, the blank has been coiled in the plane of a true helix, so that the edges of the washer next the cut being in the same general plane, when sufficient force was put upon the washer to overcome the spring, the faces of the washer became paralleled, and the power of the spring once lost or overcome, the biting-faces due to the section of the washer were lost.

The object of the present invention is to form the spring-washer so that the biting-points can only be destroyed by force sufficient to both overcome the spring and bend or crush the metal of which the washer is made.

In making my washer, I take a steel rod, preferably square, and cut it into blanks of a length equal to the circumference of the washer to be formed, the cut being made obliquely, and the bar turned after each cut, so as to obtain a blank of the general form shown in Fig. 1.

Such a blank is then heated to redness and coiled by suitable machinery, so as to form a spring-washer like that shown in Figs. 2, 3, and 4, which is a true helix throughout, except at the points *a a* next to the section *x x*, where the metal is bent from the true helical line to form projecting or biting edges, the line of the true helix being shown dotted.

The turning of the edges from the true helical plane may be done before, during, or after the coiling, as may be found desirable. I prefer to do it at the time of coiling. The washer thus formed is then tempered in the usual manner, and subjected to compression to set and test it.

The helical washer, being the reverse of the threaded bolt with which it is employed, will permit of the nut being screwed down on the bolt to the desired distance, but will resist the withdrawal of the nut, the projecting points embedding themselves in the nut and the surface against which the washer rests.

As before specified, the washer is not rendered inefficient by power sufficient to overcome the spring, and if greater power is applied the projecting points *a a* become embedded in the nut, which is usually of softer metal than that required for the washer.

I am aware that an annular spring-washer is not new, and I am also aware that a spring-washer has heretofore been made so as to form biting edges which engage, respectively, with the nut and with the bar, and therefore I do not claim such subject-matter.

Having thus described my invention, what I claim, and desire to secure by Letters Patent, is—

An annular spring-washer the transverse edges of which, next the cut or section, project beyond the true helical plane, so as to form biting-points, substantially as specified.

In testimony whereof I, the said WILLIAM METCALF, have hereunto set my hand.

WILLIAM METCALF.

Witnesses:
F. W. RITTER, Jr.,
T. B. KERR.